United States Patent
Tang et al.

(10) Patent No.: US 12,422,863 B2
(45) Date of Patent: Sep. 23, 2025

(54) METHOD AND APPARATUS OF CONTROLLING ROBOT, AND NON-TRANSITORY COMPUTER-READABLE STORAGE MEDIUM

(71) Applicant: JINGDONG TECHNOLOGY INFORMATION TECHNOLOGY CO., LTD., Beijing (CN)

(72) Inventors: Enqiong Tang, Beijing (CN); Chao Wang, Beijing (CN); Xiujun Yao, Beijing (CN); Chenguang Gui, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 183 days.

(21) Appl. No.: 18/263,865

(22) PCT Filed: Jan. 11, 2022

(86) PCT No.: PCT/CN2022/071198
§ 371 (c)(1),
(2) Date: Aug. 1, 2023

(87) PCT Pub. No.: WO2022/166536
PCT Pub. Date: Aug. 11, 2022

(65) Prior Publication Data
US 2024/0126298 A1     Apr. 18, 2024

(30) Foreign Application Priority Data

Feb. 7, 2021   (CN) .......................... 202110168953.9

(51) Int. Cl.
*G05D 1/622*   (2024.01)
*G01S 17/08*   (2006.01)
(Continued)

(52) U.S. Cl.
CPC .............. *G05D 1/622* (2024.01); *G01S 17/08* (2013.01); *G01S 17/931* (2020.01); *G05D 2111/17* (2024.01)

(58) Field of Classification Search
CPC ...... G05D 1/622; G05D 2111/17; G05D 1/40; G01S 17/931; G01S 17/08
See application file for complete search history.

(56) References Cited

U.S. PATENT DOCUMENTS

| 2004/0073368 A1 | 4/2004 | Gonzalez-Banos et al. |
| 2014/0095009 A1 | 4/2014 | Oshima et al. |

(Continued)

FOREIGN PATENT DOCUMENTS

| CN | 103995984 A | 8/2014 |
| CN | 106708059 A | 5/2017 |

(Continued)

OTHER PUBLICATIONS

"Communication with Supplementary European Search Report", EP Application No. 22748815.2, Oct. 25, 2024, 12 pp.

(Continued)

*Primary Examiner* — Aaron L Troost
(74) *Attorney, Agent, or Firm* — Myers Bigel, P.A.

(57) ABSTRACT

This disclosure provides a method and apparatus for controlling a robot, and a non-transitory computer-readable storage medium, and relates to the technical field of robot. The method of controlling a robot therein includes: constructing a closed plane graph according to a size of a chassis of the robot, the closed plane graph passing through a center point of the robot chassis and a target point on a planning path of the robot, a connection line between the center point and the target point being a symmetry axis of the closed plane graph; performing laser irradiation from the center point to an area of the closed plane graph to acquire a laser (Continued)

point set; and controlling a movement state of the robot according to a farthest distance between all the laser points in the laser point set and the center point.

20 Claims, 6 Drawing Sheets

(51) Int. Cl.
  *G01S 17/931* (2020.01)
  *G05D 111/10* (2024.01)

(56) References Cited

U.S. PATENT DOCUMENTS

| | | | |
|---|---|---|---|
| 2018/0057049 A1 | 3/2018 | Stewart et al. | |
| 2020/0159227 A1* | 5/2020 | Cohen | G05D 1/024 |
| 2021/0012111 A1* | 1/2021 | Choi | G05D 1/0246 |
| 2021/0018929 A1* | 1/2021 | Choi | G05D 1/2469 |

FOREIGN PATENT DOCUMENTS

| | | |
|---|---|---|
| CN | 106970617 A | 7/2017 |
| CN | 108415413 A | 8/2018 |
| CN | 108983777 A | 12/2018 |
| CN | 109828566 A | 5/2019 |
| CN | 109927035 A | 6/2019 |
| CN | 111795699 A | 10/2020 |
| CN | 112965490 A | 6/2021 |
| DE | 102012008846 A1 | 11/2012 |
| KR | 100791386 B1 | 1/2008 |
| KR | 101539270 B1 | 7/2015 |
| WO | 2019190395 A1 | 10/2019 |

OTHER PUBLICATIONS

"First Office Action and English language translation", CN Application No. 202110168953.9, Jan. 11, 2024, 19 pp.
He, Bin, et al., "Design of Robot Safe Working Strategy Based on Laser Sensor", 2018 Chinese Automation Congress (CAC), Xi'an China, Nov. 30, 2018, 6 pp.
Wen, Rui, et al., "Path Planning Method for Mobile Robot", Ordnance Industry Automation, vol. 28, No. 12, Dec. 2009, pp. 60-63.
Xue, Shuai, et al., "Design of Phase Information Acquisition System for Atomic Magnetometer Magnetic Resonance Signal Based on Synchronous Dual-port SARM", Navigation Positioning & Timing, vol. 5, No. 2, Mar. 2018, pp. 75-80.
"International Search Report and Written Opinion of the International Searching Authority with English language translation", International Application No. PCT/CN2022/071198, Apr. 1, 2022, 17 pp.

* cited by examiner

```
with the laser point at the farthest distance from the
  center point as a starting point, a first one laser
point at a distance equal to the first threshold from
the center point is searched clockwise from the laser
              point set, as a first laser point
```
— S1031

```
with the laser point at the farthest distance from the
  center point as a starting point, a first one laser
point at a distance equal to the first threshold from
the center point is searched counterclockwise from the
           laser point set, as a second laser point
```
— S1032

```
the robot is controlled to move toward a direction of
   a bisector of an angle between a first ray and a
  second ray, the first ray being a ray pointing from
the center point to the first laser point, the second
ray being a ray pointing from the center point to the
                    second laser point
```
— S1033

Fig. 8

METHOD AND APPARATUS OF CONTROLLING ROBOT, AND NON-TRANSITORY COMPUTER-READABLE STORAGE MEDIUM

CROSS-REFERENCE TO RELATED APPLICATIONS

The present application is a U.S. National Stage application under 35 U.S.C. § 371 of International Patent Application No. PCT/CN2022/071198, filed on Jan. 11, 2022, which itself is based on and claims the priority to the Chinese patent application No. 202110168953.9, filed on Feb. 7, 2021, the disclosures of both of which are hereby incorporated in their entireties into the present application.

TECHNICAL FIELD

This disclosure relates to the technical field of robot, and in particular, to a method and apparatus for controlling a robot, and a non-transitory computer-readable storage medium.

BACKGROUND

A path of movement of a robot is determined by a planning path calculated by a path planning algorithm.

When a path is planned by the path planning algorithm, a shortest path from a starting point to an end point is first planned by a global path planning algorithm, and then, a local optimal path is planned by a local path planning algorithm, to provide direction guidance for the movement of the robot.

Common global path planning algorithms include Dijkstra algorithm, A* algorithm, D* algorithm, etc., and common local path planning algorithms include Dynamic Window Approach (DWA), artificial potential field, etc.

SUMMARY

One technical problem to be solved by the present disclosure is how to promote security of a robot in its movement process.

According to a first aspect of the present disclosure, there is provided a method of controlling a robot, comprising: constructing a closed plane graph according to a size of a chassis of the robot, the closed plane graph passing through a center point of the chassis of the robot and a target point on a planning path of the robot, a connection line between the center point and the target point being a symmetry axis of the closed plane graph; performing laser irradiation from the center point to an area of the closed plane graph to acquire a laser point set, wherein: if a distance between the center point and a laser point formed by the laser irradiation on an obstacle is greater than a distance between the center point and a laser point formed by the laser irradiation on the closed plane graph, the laser point formed by the laser irradiation on the closed plane graph is added into the laser point set; and if the distance between the center point and the laser point formed by the laser irradiation on the obstacle is not greater than the distance between the center point and the laser point formed by the laser irradiation on the closed plane graph, the laser point formed by the laser irradiation on the obstacle is added into the laser point set; and controlling a movement state of the robot according to a farthest distance between the center point and the laser points in the laser point set In some embodiments, the constructing the closed plane graph according to the size of the chassis of the robot comprises: taking a target point at a nearest distance from the center point on the planning path of the robot as a first target point; taking a target point on the planning path of the robot, wherein a distance to which from the first target point is closest to a length of a diagonal of the chassis of the robot, as a second target point; and constructing a rectangle with a connection line between the center point and the second target point as the symmetry axis, a length of one side of the rectangle being a length of the connection line between the center point and the second target point, a length of another side of the rectangle being the length of the diagonal.

In some embodiments, the performing laser irradiation from the center point to the area of the closed plane graph to acquire the laser point set comprises: establishing a coordinate system with the center point as an origin; determining coordinates of the vertices of the rectangle; performing laser irradiation from the center point to an area of the rectangle to acquire coordinates of the laser points formed by the laser irradiation on the obstacle; and determining coordinates of all the laser points in the laser point set according to the coordinates of the vertices of the rectangle, the coordinates of the laser points formed by the laser irradiation on the obstacle, and a direction pointing from the center point to the second target point.

In some embodiments, the determining coordinates of the vertices of the rectangle comprises: calculating the coordinates of the vertices of the rectangle according to a length of a neutrality line, the length of the diagonal, and the direction pointing from the center point to the second target point.

In some embodiments, wherein the controlling the movement state of the robot according to a farthest distance between the center point and the laser points in the laser point set comprises: in a case where the farthest distance is not greater than a first threshold, controlling the robot to stop moving.

In some embodiments, wherein the controlling the movement state of the robot according to a farthest distance between the center point and the laser points in the laser point set comprises: in a case where the farthest distance is greater than a first threshold, controlling a movement direction of the robot according to a laser point at the farthest distance from the center point in the laser point set.

In some embodiments, wherein the controlling the movement direction of the robot according to the laser point at the farthest distance from the center point in the laser point set comprises: with the laser point at the farthest distance from the center point as a starting point, clockwise searching, from the laser point set, a first one laser point at a distance from the center point equal to the first threshold, as a first laser point; with the laser point at the farthest distance from the center point as a starting point, counterclockwise searching, from the laser point set, a first one laser point at a distance from the center point equal to the first threshold, as a second laser point; and controlling the robot to move towards a direction of a bisector of an angle between a first ray pointing from the center point to the first laser point and a second ray pointing from the center point to the second laser point.

In some embodiments, the first threshold is half of a length of a diagonal of the chassis of the robot.

In some embodiments, the method of controlling the robot further comprising: determining whether the center point enters a preset junction area corresponding to a preset passage, a width of the preset passage being less than a second threshold; and in a case where the center point enters the preset junction area, executing the operation of constructing the closed plane graph according to the size of the chassis of the robot.

According to a second aspect of the present disclosure, there is provided an apparatus for controlling a robot, comprising: a graph construction module configured to construct a closed plane graph according to a size of a chassis of the robot, the closed plane graph passing through a center point of the chassis of the robot and a target point on a planning path of the robot, a connection line between the center point and the target point being a symmetry axis of the closed plane graph; a laser point set acquisition module configured to perform laser irradiation from the center point to an area of the closed plane graph to acquire a laser point set, wherein: if a distance between the center point and a laser point formed by the laser irradiation on an obstacle is greater than a distance between the center point and a laser point formed by the laser irradiation on the closed plane graph, the laser point formed by the laser irradiation on the closed plane graph is added into the laser point set; and if the distance between the center point and the laser point formed by the laser irradiation on the obstacle is not greater than the distance between the center point and the laser point formed by the laser irradiation on the closed plane graph, the laser point formed by the laser irradiation on the obstacle is added into the laser point set; and a movement state control module configured to control a movement state of the robot according to a farthest distance between the center point and the laser points in the laser point set and the center point.

In some embodiments, the graph construction module is configured to: take a target point at a nearest distance from the center point on the planning path of the robot as a first target point; taking a target point on the planning path of the robot, wherein a distance to which from the first target point is closest to a length of a diagonal of the chassis of the robot, as a second target point; and construct a rectangle with a connection line between the center point and the second target point as the symmetry axis, a length of one side of the rectangle being a length of the connection line between the center point and the second target point, a length of another side of the rectangle being the length of the diagonal.

In some embodiments, the laser point set acquisition module is configured to: establish a coordinate system with the center point as an origin; determine coordinates of the vertices of the rectangle; perform laser irradiation from the center point to an area of the rectangle to acquire coordinates of the laser points formed by the laser irradiation on the obstacle; and determine coordinates of all the laser points in the laser point set according to the coordinates of the vertices of the rectangle, the coordinates of the laser points formed by the laser irradiation on the obstacle, and a direction pointing from the center point to the second target point.

In some embodiments, the laser point set acquisition module is configured to: calculate the coordinates of the vertices of the rectangle according to a length of a neutrality line, the length of the diagonal, and the direction pointing from the center point to the second target point.

In some embodiments, the movement state control module is configured to: in a case where the farthest distance is not greater than a first threshold, control the robot to stop moving.

In some embodiments, the movement state control module is configured to: in a case where the farthest distance is greater than a first threshold, control a movement direction of the robot according to a laser point at the farthest distance from the center point in the laser point set.

In some embodiments, the movement state control module is configured to: with the laser point at the farthest distance from the center point as a starting point, clockwise search, from the laser point set, a first one laser point at a distance from the center point equal to the first threshold, as a first laser point; with the laser point at the farthest distance from the center point as a starting point, counterclockwise search, from the laser point set, a first one laser point at a distance from the center point equal to the first threshold, as a second laser point; and control the robot to move towards a direction of a bisector of an angle between a first ray pointing from the center point to the first laser point and a second ray pointing from the center point to the second laser point.

In some embodiments, the first threshold is half of a length of a diagonal of the chassis of the robot.

In some embodiments, the apparatus for controlling the robot further comprises a junction determination module configured to: determine whether the center point enters a preset junction area corresponding to a preset passage, a width of the preset passage being less than a second threshold; and in a case where the center point enters the preset junction area, start the graph construction module, the laser point set acquisition module and the movement state control module to work.

According to a third aspect of the present disclosure, there is provided an apparatus for controlling a robot, comprising: a memory; and a processor coupled to the memory, wherein the processor is configured to perform a method according to the above method of controlling a robot based on instructions stored in the memory.

According to a fourth aspect of the present disclosure, there is provided a non-transitory computer-readable storage medium having stored thereon computer program instructions which, when executed by a processor, implement steps of a method according to the above method of controlling a robot.

According to a fifth aspect of the present disclosure, there is provided a robot, comprising the above apparatus for controlling a robot, a chassis of the robot, and a laser transmitter.

BRIEF DESCRIPTION OF THE DRAWINGS

In order to more clearly illustrate embodiments of the present disclosure or technical solutions in the related art, the drawings that need to be used in the description of the embodiments or the related art will be briefly introduced below. It is obvious that the drawings in the description below are merely some embodiments of the present disclosure, and for those skilled in the art, other drawings can be obtained according to the drawings without paying out creative efforts.

FIG. 8 is a flow diagram of the process of controlling the movement state of the robot according to some embodiments of the present disclosure.

DETAILED DESCRIPTION

Technical solutions in the embodiments of the present disclosure will be described clearly and completely with reference to the drawings in the embodiments of the present disclosure, and it is obvious that the described embodiments are merely some embodiments of the present disclosure, rather than all embodiments. The following description of at least one exemplary embodiment is merely illustrative in nature and is in no way intended to limit the disclosure and its application or use. Based on the embodiments in the present disclosure, all other embodiments, which are obtained by one of ordinary skill in the art without making creative efforts, are intended to fall within the protection scope of the present disclosure.

After research, it has been found that when a local path planning algorithm is executed, it is needed to rely on a positioning coordinate of a robot. When there is a deviation in the positioning coordinate of the robot, there is also a deviation in a local optimal path planned by the local path planning algorithm. If the robot moves on a wide field, the deviation in the positioning coordinate within a certain range will not greatly influence security of the robot. However, when the robot needs to enter a narrow passage, a probability that the robot collides with an obstacle will be greatly increased by the deviation in the positioning coordinate. The narrower the width of the passage, the greater the adverse effect of the deviation in the positioning coordinate, and the more easily the collision occurs when the robot enters the passage.

In order to reduce the adverse effect of the deviation in the positioning coordinate of the robot, the present disclosure provides a method of controlling a robot, which is described in detail below.

Figure 1:
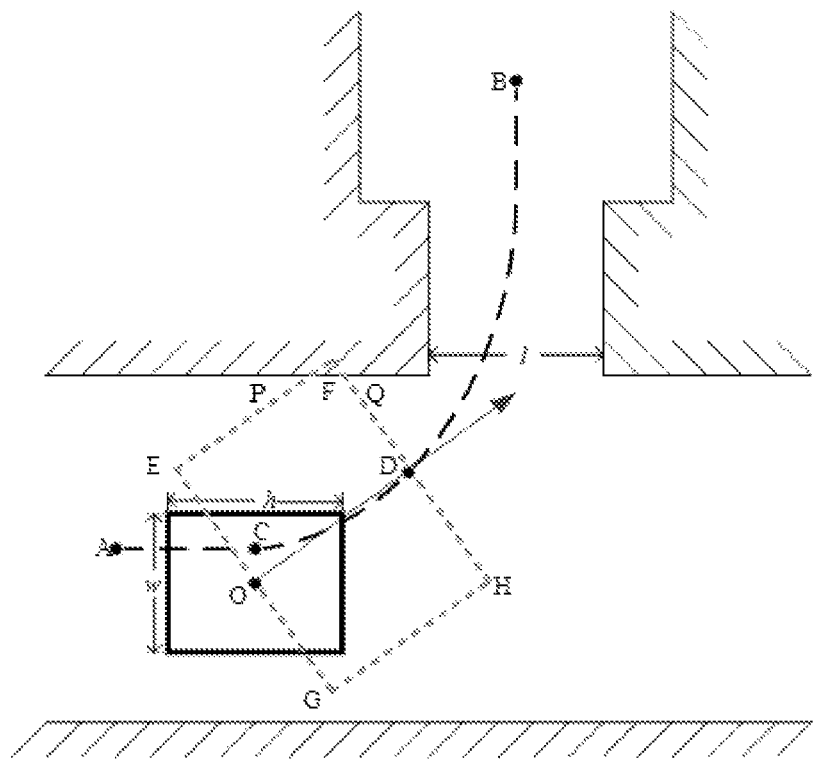
FIG. 1 is a schematic diagram of a movement process of a robot.

Some embodiments of the method of controlling a robot in the present disclosure are first described in conjunction with FIG. 1.

Figure 5:
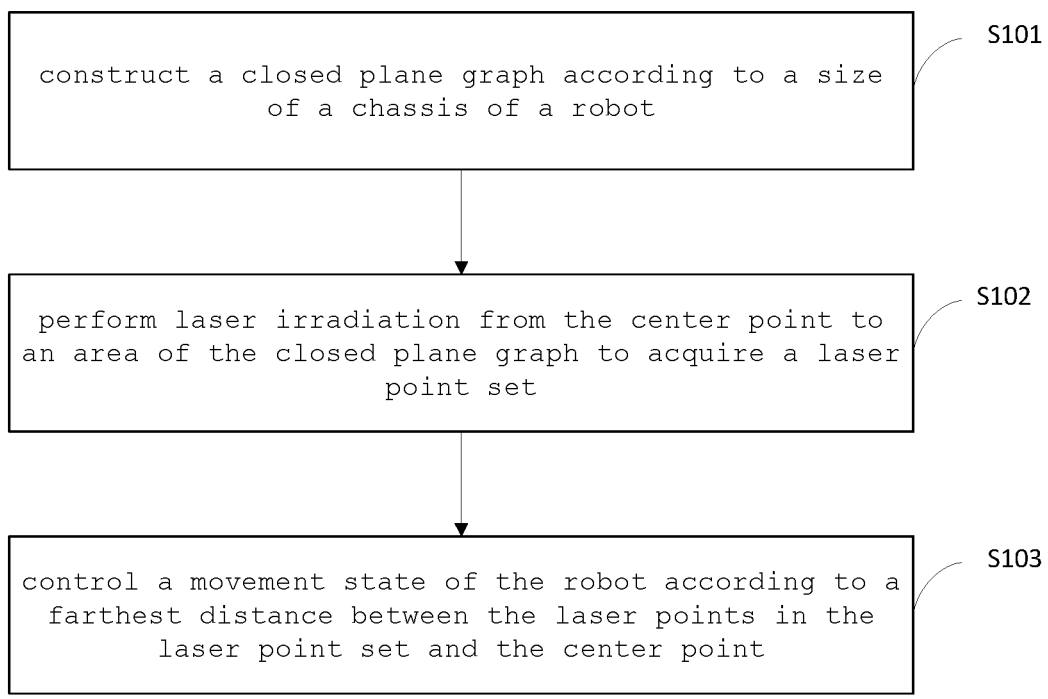
FIG. 5 is a flow diagram of a method of controlling a robot according to some embodiments of the present disclosure.

FIG. 1 shows a movement process of a robot. As shown in FIG. 1, it is assumed that a dotted line AB is a planning path of the robot, a point A being a starting point of the planning path of the robot, a point B being an end point of the planning path of the robot. The robot is indicated to enter a narrow passage according to the planning path of the robot, wherein the narrow passage has a width of I. A solid-line rectangle represents a robot chassis, which has a point O as a center point, and has a length of h and a width of w. Let a coordinate of the point O under a world coordinate system be $(x_{wo}, y_{wo})$; and the planning path of the robot AB consists of n planning points, in which a coordinate of a planning point i under the world coordinate system is $(x_{wi}, y_{wi})$, $(i=1, 2, 3, \ldots, n)$. The point A is a planning point that the robot has already passed through, and points C, D, B are planning points that the robot has not yet passed through (i.e., target points on the planning path of the robot). The method of controlling the robot comprises steps S101 to S103, as shown in FIG. 5.

In the step S101, a closed plane graph is constructed according to the size of the chassis of the robot.

When the closed plane graph is constructed, it is required that the closed plane graph passes through the center point O of the robot chassis and the target point (such as the point D) on the planning path of robot, and that a connection line between the center point O and the target point (such as the point D) is a symmetry axis of the closed plane graph. Those skilled in the art could appreciate that a specific shape of the closed plane graph can be various. For example, the closed plane graph can be a rectangle, as shown by a dashed rectangle EFHG in FIG. 1, which passes through the points O and D, and has the OD as a symmetry axis. For another example, the closed plane graph can also be a semicircle, which passes through the points O and D, and has the OD as a symmetry axis and EG as a diameter.

In the step S102, laser irradiation is performed from the center point O to an area of the closed plane graph to acquire a laser point set.

The laser point set is acquired according to the following process. At first, the laser point set is an empty one. If a distance between a laser point formed by the laser irradiation on an obstacle and the center point is greater than a distance between a laser point formed by the laser irradiation on the closed plane graph and the center point, the laser point formed by the laser irradiation on the closed plane graph is added into the laser point set. If the distance between the laser point formed by the laser irradiation on the obstacle and the center point is not greater than the distance between the laser point formed by the laser irradiation on the closed plane graph and the center point, the laser point formed by the laser irradiation on the obstacle is added into the laser point set.

As shown in FIG. 1, it is assumed that the closed plane graph is the dashed rectangle EFHG, and junction points between the dashed rectangle EFHG and the obstacle are points P and Q. Then, the laser irradiation is performed from the point O to an area of the dashed rectangle EFHG, thus the acquired laser point set includes all laser points formed by the laser irradiation on a polygon EPQHG.

In the step S103, a movement state of the robot is controlled according to a farthest distance between all the laser points in the laser point set and the center point.

For example, under the condition that the farthest distance is not greater than a first threshold, it is indicated that the robot is at a nearer distance from the obstacle, and the robot should be controlled to stop moving. For another example, under the condition that the farthest distance is greater than the first threshold, it is indicated that the robot is at a farther distance from the obstacle, and a movement direction of the robot can be controlled according to a laser point (for example, a laser point that coincides with the point H) at the farthest distance from the center point in the laser point set (for example, the movement direction of the robot is controlled to be a direction of a vector OH). The first threshold can be set to be, for example, half of a length of a diagonal of the chassis of the robot.

According to this embodiment, the closed plane graph is constructed in the movement direction of the robot, the laser point set is determined according to the closed plane graph, and the movement state of the robot is controlled according to the farthest distance between the laser points in the laser point set and the center point of the chassis of the robot, so that a probability that the robot collides with an obstacle when entering an entrance of a narrow passage is reduced, and security of the robot in the movement process is further promoted.

In some embodiments, the method of controlling the robot further comprises a step S100 executed before the above step S101.

In the step S100, it is determined whether the center point of the chassis of the robot enters a preset junction area corresponding to a preset passage, wherein a width of the preset passage is less than a second threshold. Under the condition that the center point enters the preset junction area, the steps S101 to S103 are executed.

Those skilled in the art could understand that: the preset junction area can be set according to an actual application scenario; and the determining whether the center point of the chassis of the robot enters a preset junction area corresponding to a preset passage, can be implemented by a positioning coordinate of the chassis of the robot. The above steps S101 to S103 are executed when the robot approaches the narrow passage, and the above steps S101 to S103 are not executed when the robot does not approach the narrow passage yet, so that consumption of computing resources can be effectively reduced.

Figure 6:
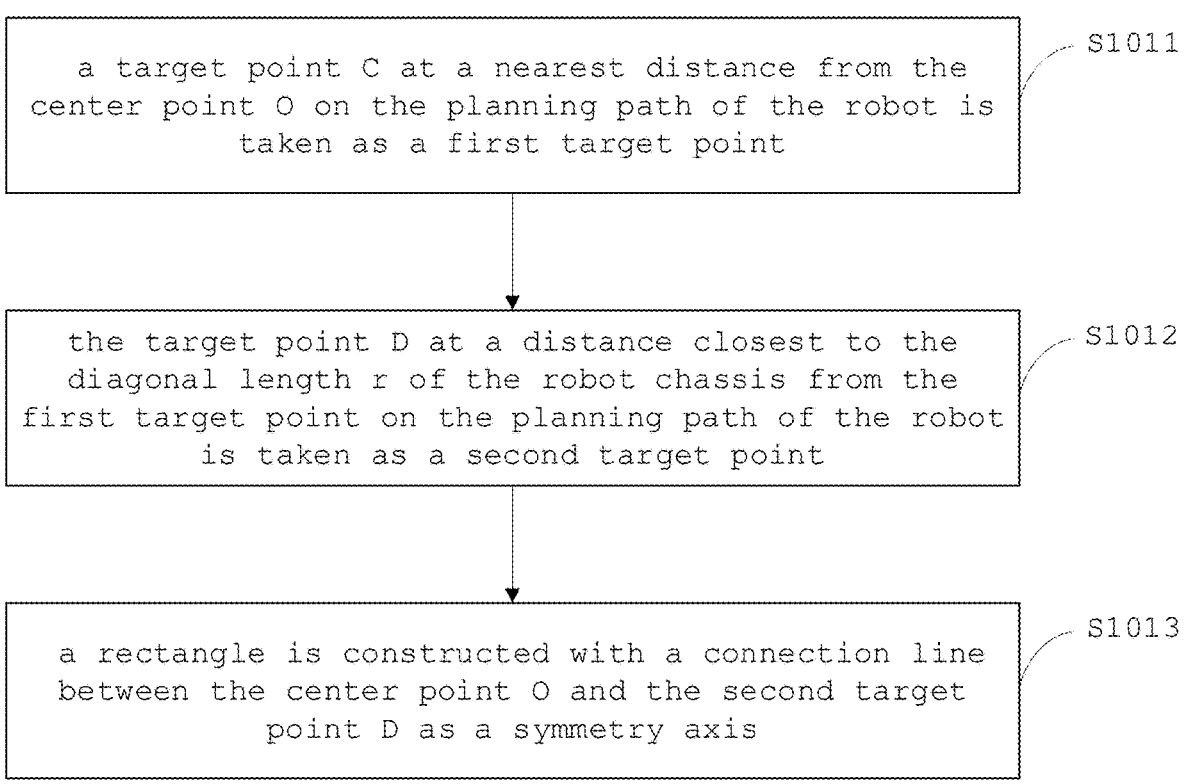
FIG. 6 is a flow diagram of the process of constructing the closed plane graph according to some embodiments of the present disclosure.

Some embodiments of constructing a closed plane graph are described below in conjunction with FIG. 6. As shown in FIG. 6, the process of constructing the closed plane graph comprises steps S1011 to S1013.

In the step S1011, a target point C at a nearest distance from the center point O on the planning path of the robot is taken as a first target point.

Let a coordinate of the point C under a world coordinate system be $(x_{wc}, y_{wc})$, then $x_{wc}$ and $y_{wc}$ satisfy the equation (1), where sqrt (·) represents a square root, i=1, 2, 3, . . . , n.

$$sqrt((x_{wc}-x_{wo})^2+(y_{wc}-y_{wo}))=\min\{sqrt((x_{wi}-x_{wo})^2+(y_{wi}-y_{wo})^2)\} \quad (1)$$

In the step S1012, the target point D at a distance closest to the diagonal length r of the robot chassis from the first target point on the planning path of the robot is taken as a second target point.

Let a coordinate of the point D under the world coordinate system be $(x_{wd}, y_{wd})$, then $x_{wd}$ and $y_{wd}$ satisfy the equation (2), where abs (·) represents an absolute value, i=1, 2, 3, . . . , n.

$$abs(sqrt((x_{wd}-x_{wc})^2+(y_{wd}-y_{wc})^2)-r)=\min\{abs(sqrt((x_{wi}-x_{wd})^2+(y_{wi}-y_{wd})^2)-r)\} \quad (2)$$

In the step S1013, a rectangle is constructed with a connection line between the center point O and the second target point D as a symmetry axis, wherein a length of one side of the rectangle is a length k of the symmetry axis OD, and a length of another side of the rectangle is the diagonal length r, denoted by $r=sqrt(w^2+h^2)$. The side of the rectangle with the length of k is parallel to the OD and the side of the rectangle with the length of r is perpendicular to the OD.

Figure 7:
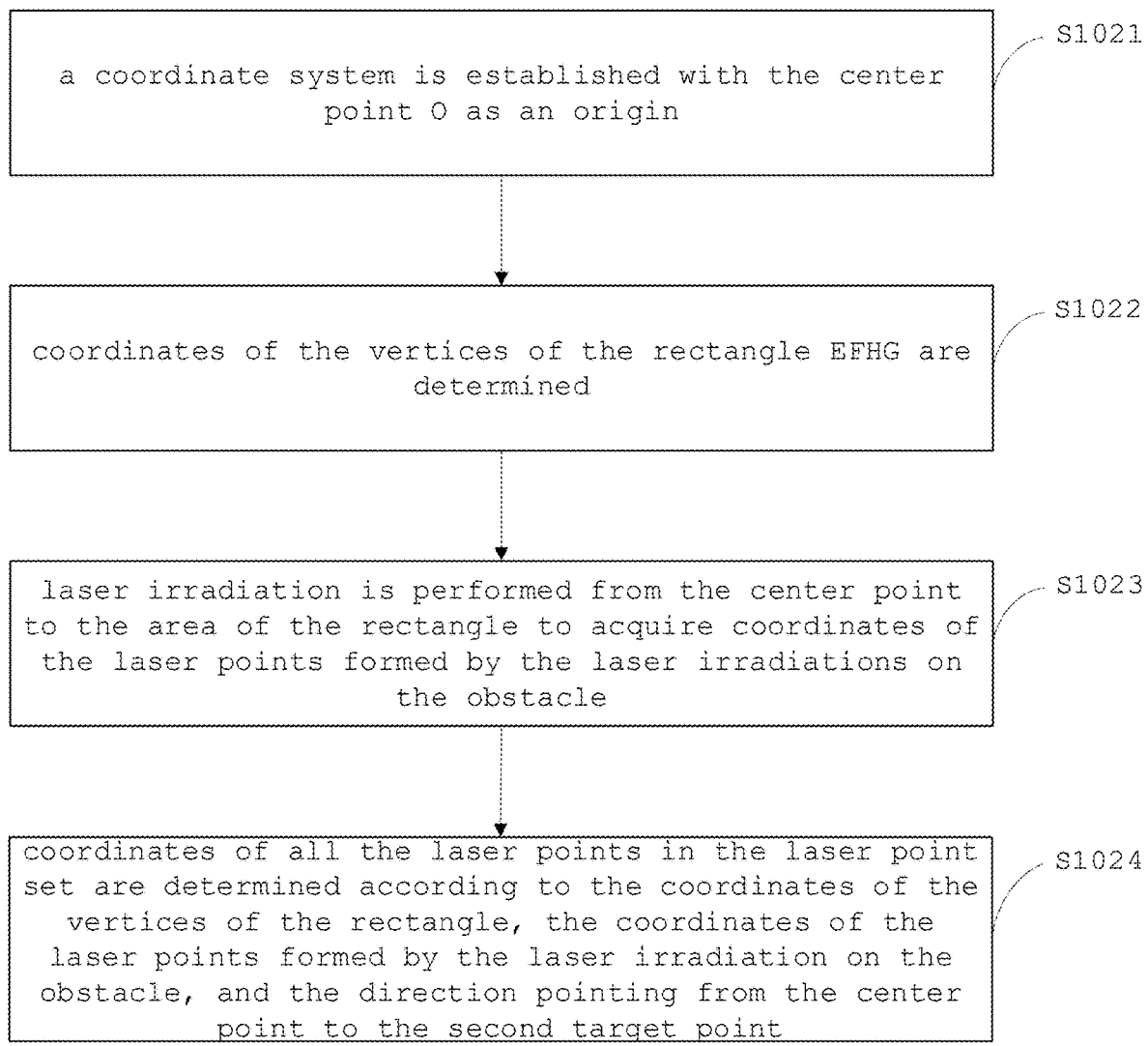
FIG. 7 is a flow diagram of the process of acquiring the laser point set according to some embodiments of the present disclosure.

Some embodiments of acquiring a laser point set are described below in conjunction with FIG. 7. As shown in FIG. 7, the process of acquiring the laser point set comprises steps S1021 to S1024.

In the step S1021, a coordinate system is established with the center point O as an origin.

Those skilled in the art should understand that the coordinate system established with the center point O as the origin is a coordinate system of a body of the robot. The coordinate system of the body of the robot is different from the world coordinate system, an x-axis of the coordinate system of the body of the robot is parallel to an x-axis of the world coordinate system, a y-axis of the coordinate system of the body of the robot is parallel to a y-axis of the world coordinate system.

In the step S1022, coordinates of the vertices of the rectangle EFHG are determined.

Specifically, the process of calculating the coordinates of the vertices of the rectangle EFHG according to a length of a neutrality line, the length of the diagonal, and a direction pointing from the center point to the second target point is as follows.

Let a coordinate of the point D under the body coordinate system be $(x_{bd}, y_{bd})$, then there are equations (3) to (5):

$$x_{bd}=x_{wd}-x_{wo} \quad (3)$$

$$y_{bd}=y_{wd}-y_{wo} \quad (4)$$

$$k=sqrt(x_{bd}^2+y_{bd}^2) \quad (5)$$

Under the body coordinate system, the coordinates $(x_{be}, y_{be})$, $(x_{bf}, y_{bf})$, $(x_{bg}, y_{bg})$ and $(x_{bh}, y_{bh})$ of the vertices E, F, G and H of the rectangle can be expressed by equations (6) to (13):

$$x_{be}=-r/2 \sin \alpha \quad (6)$$

$$y_{be}=r/2 \cos \alpha \quad (7)$$

$$x_{bf}=k \cos \alpha-r/2 \sin \alpha \quad (8)$$

$$y_{bf}=k \sin \alpha+r/2 \cos \alpha \quad (9)$$

$$x_{bg}=r/2 \sin \alpha \quad (10)$$

$$y_{bg}=-r/2 \cos \alpha \quad (11)$$

$$x_{bh}=k \cos \alpha+\sin \alpha \quad (12)$$

$$y_{bh}=k \sin \alpha-r/2 \cos \alpha \quad (13)$$

where $\alpha$ is an angle of the vector OD in the body coordinate system and can be expressed by the equation (14):

$$\alpha = \begin{cases} \left|atan\frac{y_{bd}}{x_{bd}}\right|, & (x_{bd}>0, y_{bd}>0) \\ \pi-\left|atan\frac{y_{bd}}{x_{bd}}\right|, & (x_{bd}<0, y_{bd}>0) \\ \pi+\left|atan\frac{y_{bd}}{x_{bd}}\right|, & (x_{bd}<0, y_{bd}<0) \\ -\left|atan\frac{y_{bd}}{x_{bd}}\right|, & (x_{bd}>0, y_{bd}<0) \end{cases} \quad (14)$$

In the step S1023, laser irradiation is performed from the center point to the area of the rectangle to acquire coordinates of the laser points formed by the laser irradiations on the obstacle.

It is assumed that there are m laser beams in total for the irradiation from the point O, and let a coordinate of a laser point formed by irradiation of a pi-th beam of laser on the obstacle be $(x_{bpi}, y_{bpi})$, where pi=1, 2, 3, . . . , m.

In the step S1024, coordinates of all the laser points in the laser point set are determined according to the coordinates of the vertices of the rectangle, the coordinates of the laser points formed by the laser irradiation on the obstacle, and the direction pointing from the center point to the second target point.

Let the coordinates of all the laser points in the laser point set be $(x'_{bpi}, y'_{bpi})$ pi=1, 2, 3, . . . , m, then equations (15), (16) are satisfied:

$$x'_{bpi}=x''_{bpi} \cos \alpha-y''_{bpi} \sin \alpha \quad (15)$$

$$y'_{bpi}=x''_{bpi} \sin \alpha+y''_{bpi} \cos \alpha \quad (16)$$

wherein $x''_{bpi}$ and $y''_{bpi}$ can be expressed by equations (17) and (18), respectively:

$$x''_{bpi} = \begin{cases} 0, & (x_{bpi}\cos\alpha + y_{bpi}\sin\alpha \leq 0) \\ x_{bpi}\cos\alpha + y_{bpi}\sin\alpha, & \left(\frac{x_{bpi}\cos\alpha + y_{bpi}\sin\alpha}{-x_{bpi}\sin\alpha + y_{bpi}\cos\alpha} > \frac{x_{bf}\cos\alpha + y_{bf}\sin\alpha}{-x_{bf}\sin\alpha + y_{bf}\cos\alpha}\right) \\ x_{bpi}\cos\alpha + y_{bpi}\sin\alpha, & \left(\frac{x_{bpi}\cos\alpha + y_{bpi}\sin\alpha}{-x_{bpi}\sin\alpha + y_{bpi}\cos\alpha} < \frac{x_{bh}\cos\alpha + y_{bh}\sin\alpha}{-x_{bh}\sin\alpha + y_{bh}\cos\alpha}\right) \\ -x_{bf}\sin\alpha + y_{bf}\cos\alpha, & \left(\frac{x_{bh}\cos\alpha + y_{bh}\sin\alpha}{-x_{bh}\sin\alpha + y_{bh}\cos\alpha} \leq \frac{x_{bpi}\cos\alpha + y_{bpi}\sin\alpha}{-x_{bpi}\sin\alpha + y_{bpi}\cos\alpha} \leq \frac{x_{bf}\cos\alpha + y_{bf}\sin\alpha}{-x_{bf}\sin\alpha + y_{bf}\cos\alpha}\right) \end{cases} \quad (17)$$

$$y'''_{bpi} = \begin{cases} 0, & (x_{bpi}\cos\alpha + y_{bpi}\sin\alpha \leq 0) \\ l, & \left(\frac{x_{bpi}\cos\alpha + y_{bpi}\sin\alpha}{-x_{bpi}\sin\alpha + y_{bpi}\cos\alpha} > \frac{x_{bg}\cos\alpha + y_{bg}\sin\alpha}{-x_{bg}\sin\alpha + y_{bg}\cos\alpha}\right) \\ -l, & \left(\frac{x_{bpi}\cos\alpha + y_{bpi}\sin\alpha}{-x_{bpi}\sin\alpha + y_{bpi}\cos\alpha} < \frac{x_{bh}\cos\alpha + y_{bh}\sin\alpha}{-x_{bh}\sin\alpha + y_{bh}\cos\alpha}\right) \\ -x_{bpi}\sin\alpha + y_{bpi}\cos\alpha, & \left(\frac{x_{bh}\cos\alpha + y_{bh}\sin\alpha}{-x_{bh}\sin\alpha + y_{bh}\cos\alpha} \leq \frac{x_{bpi}\cos\alpha + y_{bpi}\sin\alpha}{-x_{bpi}\sin\alpha + y_{bpi}\cos\alpha} \leq \frac{x_{bf}\cos\alpha + y_{bf}\sin\alpha}{-x_{bf}\sin\alpha + y_{bf}\cos\alpha}\right) \end{cases} \quad (18)$$

Some embodiments of controlling a movement state of the robot are described below. As shown in FIG. 8, the process of controlling the movement state of the robot comprises steps S1031 to S1033.

In the step S1031, with the laser point at the farthest distance from the center point as a starting point, a first one laser point at a distance equal to the first threshold from the center point is searched clockwise from the laser point set, as a first laser point.

In the step S1032, with the laser point at the farthest distance from the center point as a starting point, a first one laser point at a distance equal to the first threshold from the center point is searched counterclockwise from the laser point set, as a second laser point.

In the step S1033, the robot is controlled to move toward a direction of a bisector of an angle between a first ray and a second ray, the first ray being a ray pointing from the center point to the first laser point, the second ray being a ray pointing from the center point to the second laser point.

Taking an example that the first threshold is half of the length of diagonal of the chassis of the robot (i.e., r/2), the steps S1031 to S1033 are illustrated in conjunction with FIG. 1. In all the laser points formed by the laser irradiation on the polygon EPQHG, a distance $d_{opi}$ from the coordinate $(x'_{bpi}, y'_{bpi})$ of the laser point to the center point O of the chassis is expressed by the equation (19):

$$d_{opi} = sqrt(x'^2_{bpi} + y'^2_{bpi}) \quad (19)$$

Taking FIG. 1 as an example, under the condition that the robot is at a farther distance from the obstacle, the laser point at the farthest distance from the center point O of the chassis coincides with the point H, then a first laser point clockwise searched on the polygon EPQHG with the point H as a starting point coincides with the point E, and a second laser point counterclockwise searched on the polygon EPQHG with the point H as a starting point coincides with the point G. A first ray is OE, a second ray is OG, and a movement direction of the robot is a direction of the vector OD. It could be appreciated by those skilled in the art that, under the condition that the robot is at a nearer distance from the obstacle, the first laser point may coincide with the point Q, thus, compared with the direction of the vector OD, the movement direction of the robot is clockwise offset by a certain angle with the point O as a fixed point.

Some embodiments of an apparatus for controlling a robot in the present disclosure are described below in conjunction with FIG. 2.

Figure 2:
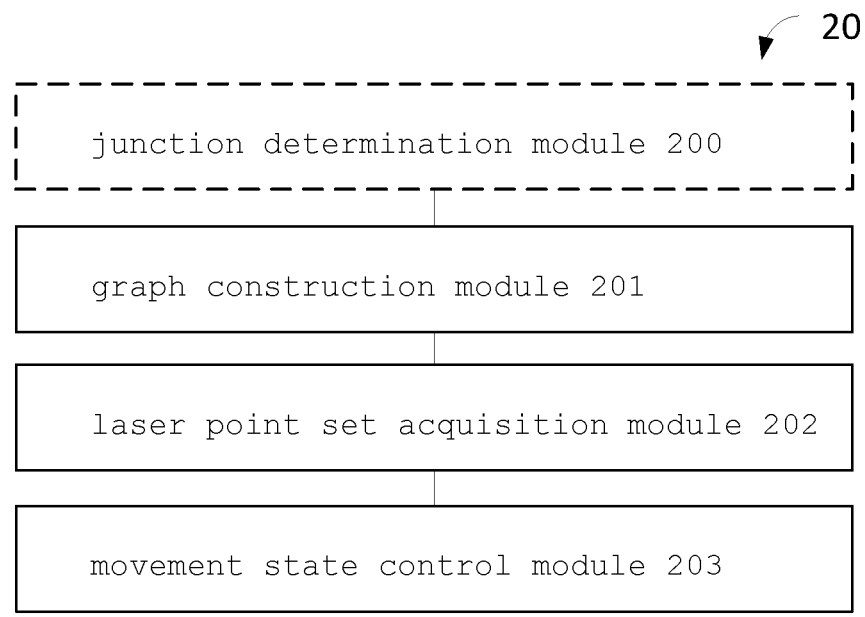
FIG. 2 is a schematic structural diagram of an apparatus for controlling a robot according to some embodiments of the present disclosure.

FIG. 2 shows a schematic structural diagram of an apparatus for controlling a robot according to some embodiments of the present disclosure. As shown in FIG. 2, the apparatus 20 for controlling a robot comprises: a graph construction module 201 configured to: construct a closed plane graph according to a size of a chassis of the robot, the closed plane graph passing through a center point of the chassis of the robot and a target point on a robot planning path, a connection line between the center point and the target point being a symmetry axis of the closed plane graph; a laser point set acquisition module 202 configured to: perform laser irradiation from the center point to an area of the closed plane graph to acquire a laser point set, wherein if a distance between a laser point formed by the laser irradiation on an obstacle and the center point is greater than a distance between a laser point formed by the laser irradiation on the closed plane graph and the center point, the laser point formed by the laser irradiation on the closed plane graph is added into the laser point set; and if the distance between the laser point formed by the laser irradiation on the obstacle and the center point is not greater than the distance between the laser point formed by the laser irradiation on the closed plane graph and the center point, the laser point formed by the laser irradiation on the obstacle is added into the laser point set; and a movement state control module 203 configured to: control a movement state of the robot according to a farthest distance between all the laser points in the laser point set and the center point.

In some embodiments, the graph construction module 201 is configured to: take a target point at a nearest distance from the center point on the planning path of the robot as a first target point; take a target point at a distance closest to a length of a diagonal of the robot chassis from the first target point on the robot planning path as a second target point; and construct a rectangle with a connection line between the center point and the second target point as a neutrality line, a length of one side of the rectangle being a length of the neutrality line, a length of the other side of the rectangle being the length of the diagonal.

In some embodiments, the laser point set acquisition module 202 is configured to: establish a coordinate system with the center point as an origin; determine coordinates of the vertices of the rectangle; perform laser irradiation from the center point to an area of the rectangle to acquire coordinates of the laser points formed by the laser irradiation on the obstacle; and determine coordinates of all the laser points in the laser point set according to the coordinates of the vertices of the rectangle, the coordinates of the laser points formed by the laser irradiation on the obstacle, and a direction pointing from the center point to the second target point.

In some embodiments, the laser point set acquisition module 202 is configured to: calculate the coordinates of the vertices of the rectangle according to the length of the neutrality line, the length of the diagonal, and the direction pointing from the center point to the second target point.

In some embodiments, the controlling a movement state of the robot according to a farthest distance between all the laser points in the laser point set and the center point comprises: under the condition that the farthest distance is not greater than a first threshold, controlling the robot to stop moving.

In some embodiments, the movement state control module 203 is configured to: under the condition that the farthest distance is greater than a first threshold, control a movement direction of the robot according to a laser point at the farthest distance from the center point in the laser point set.

In some embodiments, the movement state control module 203 is configured to: with the laser point at the farthest distance from the center point as a starting point, clockwise search, from the laser point set, a first one laser point at a distance from the center point equal to the first threshold, as a first laser point; with the laser point at the farthest distance from the center point as a starting point, counterclockwise search, from the laser point set, a first one laser point at a distance from the center point equal to the first threshold, as a second laser point; and control the robot to move towards a direction of a bisector of an angle between a first ray pointing from the center point to the first laser point and a second ray pointing from the center point to the second laser point.

In some embodiments, the first threshold is half of a length of a diagonal of the chassis of the robot.

In some embodiments, the apparatus 20 further comprises a junction determination module 200 configured to: determine whether the center point enters a preset junction area corresponding to a preset passage, a width of the preset passage being less than a second threshold; and under the condition that the center point enters the preset junction area, start the graph construction module, the laser point set acquisition module and the movement state control module to work.

According to the apparatus for controlling a robot provided in the above embodiment, the closed plane graph is constructed in the movement direction of the robot, the laser point set is determined according to the closed plane graph, and the movement state of the robot is controlled according to the farthest distance between all the laser points in the laser point set and the center point of the chassis of the robot, so that a probability that the robot collides with an obstacle when entering an entrance of a narrow passage is reduced, and security of the robot in the movement process is promoted.

In the several embodiments provided in the present application, it should be understood that the disclosed technical content can be implemented in other manners. The apparatus embodiments described above are merely illustrative, for example, the division of the units can be a logical function division, and in an actual implementation, there can be another division, for example, multiple units or components can be combined or integrated into another system, or some features can be omitted or not executed. In addition, the shown or discussed coupling or direct coupling or communication connection between each other can be indirect coupling or communication connection through some interfaces, units or modules, in electrical or other forms.

Units described as separate parts may or may not be physically separate, and parts displayed as units may or may not be physical units, i.e., located in one place, or distributed on a plurality of units. Some or all of the units can be selected according to actual needs to achieve the purpose of the solution of the embodiment.

In addition, function units in the embodiments of the present invention can be integrated into one processing unit, or each unit can exist alone physically, or two or more of the units are integrated into one unit. The above integrated unit can be implemented in a form of hardware, or in a form of a software function unit.

Other embodiments of an apparatus for controlling a robot in the present disclosure are described below in conjunction with FIG. 3.

Figure 3:
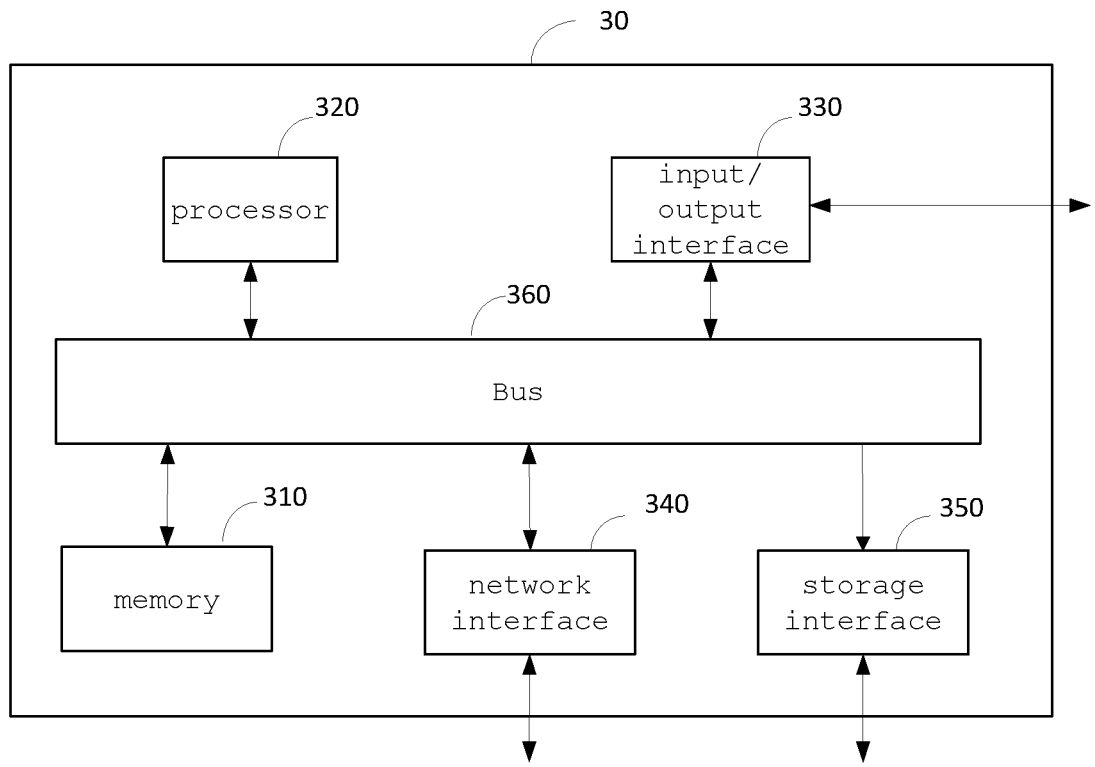
FIG. 3 is a schematic structural diagram of an apparatus for controlling a robot according to other embodiments of the present disclosure.

FIG. 3 is a schematic structural diagram of an apparatus for controlling a robot according to other embodiments of the present disclosure. As shown in FIG. 3, the apparatus 30 for controlling a robot comprises: a memory 310 and a processor 320 coupled to the memory 310, the processor 320 being configured to perform, based on instructions stored in the memory 310, the method of controlling a robot in any of the above embodiments.

The memory 310 can include, for example, a system memory, a fixed non-volatile storage medium, and the like. The system memory has thereon stored, for example, an operating system, an application program, a boot loader, other programs, and the like.

The apparatus 30 for controlling a robot can further comprise an input/output interface 330, a network interface 340, a storage interface 350, and the like. These interfaces 330, 340, 350 and the memory 310 can be connected with the processor 320, for example, by a bus 360. The input/output interface 330 provides a connection interface for input/output devices such as a display, a mouse, a keyboard, and a touch screen. The network interface 340 provides a connection interface for various networking devices. The storage interface 350 provides a connection interface for external storage devices such as a SD card and a USB flash disk.

Some embodiments of a robot in the present disclosure are described below in conjunction with FIG. 4.

Figure 4:
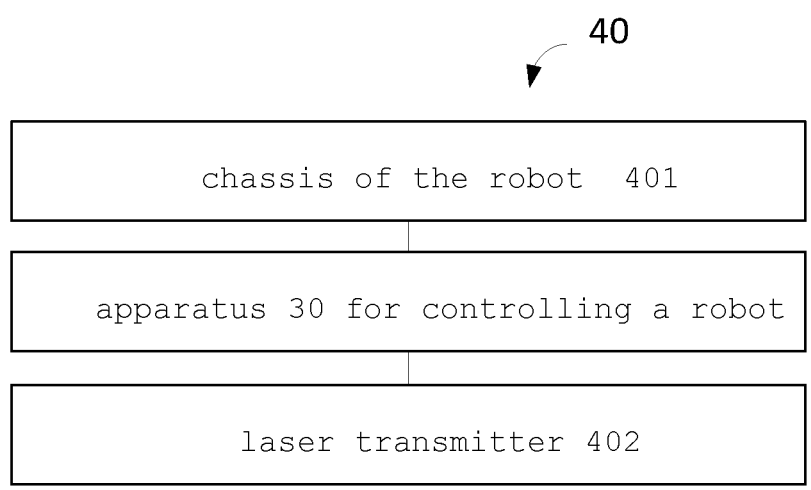
FIG. 4 is a schematic structural diagram of a robot according to some embodiments of the present disclosure.

FIG. 4 shows a schematic structural diagram of a robot according to some embodiments of the present disclosure. As shown in FIG. 4, the robot 40 comprises: the above apparatus 30 for controlling a robot, a robot chassis 401, and a laser transmitter 402.

The robot provided in the above embodiment can reduce a probability of colliding with an obstacle when entering an entrance of a narrow passage, thereby having higher security in a movement process.

The present disclosure further comprises a non-transitory computer-readable storage medium having thereon stored computer instructions which, when executed by a processor, implement the above method of controlling a robot in any of the above embodiments.

The aforementioned integrated unit, if implemented in the form of a software function unit and sold or used as a separate product, can be stored in one computer-readable storage medium. Based on such understanding, the technical solution of the present invention in essence, or the portion contributing to the prior art, or all or part of the technical solution, can be embodied in a form of a software product, which is stored in one storage medium including certain instructions for causing one computer device (which can be a personal computer, a server, or a network device) to perform all or part of the steps of the method according to the embodiments of the present invention. The aforementioned storage medium includes: various media capable of storing program code, such as a USB flash disk, a read-only memory (ROM), a random access memory (RAM), a portable hard disk, a magnetic disk, or an optical disk.

The present disclosure is described with reference to flow diagrams and/or block diagrams of the method, apparatus (system), and computer program product according to the embodiments of the disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing a function specified in one or more flows of the flow diagrams and/or one or more blocks of the block diagrams.

These computer program instructions can also be stored in a computer-readable memory that can guide a computer or other programmable data processing devices to work in a specific manner, such that the instructions, which are stored in the computer-readable memory, produce an article of manufacture including instruction means which implement a function specified in one or more flows of the flow diagrams and/or one or more blocks of the block diagrams.

These computer program instructions can also be loaded onto a computer or other programmable data processing devices to cause a series of operational steps to be performed on the computer or other programmable devices to produce a computer-implemented process such that the instructions, which are executed on the computer or other programmable devices, provide steps for implementing a function specified in one or more flows of the flow diagrams and/or one or more blocks of the block diagrams.

It should be noted that the terms "first", "second", and the like in the description and claims of this application, as well as the above drawings, are used for distinguishing similar objects and not necessarily for describing a specific order or sequence. It should be understood that the data so used can be interchanged under appropriate circumstances to facilitate the embodiments of this application described herein. Moreover, the terms "comprising" and "having", as well as any variations thereof, are intended to cover non-exclusive inclusion. For example, a process, method, system, product, or device that comprises a series of steps or units is not necessarily limited to those steps or units expressly listed, but can comprise other steps or units that are not expressly listed or inherent to the process, method, product, or device.

It should also be noted that the terms "comprising", "including", or any other variation thereof, are intended to cover non-exclusive inclusion, such that a process, method, product, or device that comprises a series of elements comprises not only those elements, but also other elements not expressly listed or elements inherent to such process, method, product, or device. Without further limitation, an element defined by the statement "comprising one . . . " does not exclude the presence of other identical elements in a process, method, product, or device that comprises the element.

The above description is only preferred embodiments of the present disclosure and not used for limiting the present disclosure, and any modifications, equivalent substitutions, improvements and the like that are made within the spirit and principle of the present disclosure should be included within the protection scope of the present disclosure.

What is claimed is:

1. A method of controlling a robot, comprising:
determining an area of a closed plane graph according to a size of a chassis of the robot, the area of the closed plane graph passing through a center point of the chassis of the robot and a target point on a planning path of the robot, a connection line between the center point and the target point being a symmetry axis of the closed plane graph;
performing laser irradiation from the center point to the area of the closed plane graph to acquire a laser point set, wherein:
if a distance between the center point and a laser point formed by the laser irradiation on an obstacle is greater than a distance between the center point and a laser point formed by the laser irradiation on the area of the closed plane graph, the laser point formed by the laser irradiation on the area of the closed plane graph is added into the laser point set; and
if the distance between the center point and the laser point formed by the laser irradiation on the obstacle is not greater than the distance between the center point and the laser point formed by the laser irradiation on the area of the closed plane graph, the laser point formed by the laser irradiation on the obstacle is added into the laser point set; and
controlling a movement state of the robot according to a farthest distance between the center point and the laser points in the laser point set.

2. The method of controlling the robot according to claim 1, wherein determining the area of the constructing the closed plane graph according to the size of the chassis of the robot comprises:
taking a target point at a nearest distance from the center point on the planning path of the robot as a first target point;
taking a target point on the planning path of the robot, wherein a distance to which from the first target point is closest to a length of a diagonal of the chassis of the robot, as a second target point; and
determining an area of a rectangle as the area of the closed plane graph with a connection line between the center point and the second target point as the symmetry axis, a length of one side of the rectangle being a length of the connection line between the center point and the second target point, a length of another side of the rectangle being the length of the diagonal.

3. The method of controlling the robot according to claim 2, wherein the performing laser irradiation from the center point to the area of the closed plane graph to acquire the laser point set comprises:
establishing a coordinate system with the center point as an origin;
determining coordinates of the vertices of the rectangle;
performing laser irradiation from the center point to an area of the rectangle to acquire coordinates of the laser points formed by the laser irradiation on the obstacle; and
determining coordinates of all the laser points in the laser point set according to the coordinates of the vertices of the rectangle, the coordinates of the laser points formed by the laser irradiation on the obstacle, and a direction pointing from the center point to the second target point.

4. The method of controlling the robot according to claim 3, wherein the determining coordinates of the vertices of the rectangle comprises:
calculating the coordinates of the vertices of the rectangle according to a length of a neutrality line of the rectangle, the length of the diagonal, and the direction pointing from the center point to the second target point.

5. The method of controlling the robot according to claim 1, wherein the controlling the movement state of the robot according to a farthest distance between the center point and the laser points in the laser point set comprises:
in a case where the farthest distance is not greater than a first threshold, controlling the robot to stop moving.

6. The method of controlling the robot according to claim 5, wherein the first threshold is half of a length of a diagonal of the chassis of the robot.

7. The method of controlling the robot according to claim 1, wherein the controlling the movement state of the robot according to a farthest distance between the center point and the laser points in the laser point set comprises:
in a case where the farthest distance is greater than a first threshold, controlling a movement direction of the robot according to a laser point at the farthest distance from the center point in the laser point set.

8. The method of controlling the robot according to claim 7, wherein the controlling the movement direction of the robot according to the laser point at the farthest distance from the center point in the laser point set comprises:
with the laser point at the farthest distance from the center point as a starting point, clockwise searching, from the laser point set, a first one laser point at a distance from the center point equal to the first threshold, as a first laser point;
with the laser point at the farthest distance from the center point as a starting point, counterclockwise searching, from the laser point set, a first one laser point at a distance from the center point equal to the first threshold, as a second laser point; and
controlling the robot to move towards a direction of a bisector of an angle between a first ray pointing from the center point to the first laser point and a second ray pointing from the center point to the second laser point.

9. The method of controlling the robot according to claim 1, further comprising:
determining whether the center point enters a preset junction area corresponding to a preset passage, a width of the preset passage being less than a second threshold,
wherein in a case where the center point enters the preset junction area, executing the operation of constructing the closed plane graph according to the size of the chassis of the robot.

10. An apparatus for controlling a robot, comprising:
a memory; and
a processor coupled to the memory, wherein the processor is configured to, based on instructions stored in the memory, perform a method comprising:
determining an area of a closed plane graph according to a size of a chassis of the robot, the area of the closed plane graph passing through a center point of the chassis of the robot and a target point on a planning path of the robot, a connection line between the center point and the target point being a symmetry axis of the closed plane graph;
performing laser irradiation from the center point to the area of the closed plane graph to acquire a laser point set, wherein:
if a distance between the center point and a laser point formed by the laser irradiation on an obstacle is greater than a distance between the center point and a laser point formed by the laser irradiation on the area of the closed plane graph, the laser point formed by the laser irradiation on the area of the closed plane graph is added into the laser point set; and
if the distance between the center point and the laser point formed by the laser irradiation on the obstacle is not greater than the distance between the center point and the laser point formed by the laser irradiation on the area of the closed plane graph, the laser point formed by the laser irradiation on the obstacle is added into the laser point set; and
controlling a movement state of the robot according to a farthest distance between the center point and the laser points in the laser point set.

11. A robot, comprising an apparatus according to claim 10, a chassis of the robot, and a laser transmitter.

12. The apparatus for controlling a robot according to claim 10, wherein the determining the area of the closed plane graph according to the size of the chassis of the robot comprises:
taking a target point at a nearest distance from the center point on the planning path of the robot as a first target point;
taking a target point on the planning path of the robot, wherein a distance to which from the first target point is closest to a length of a diagonal of the chassis of the robot, as a second target point; and
determining an area of a rectangle as the area of the closed plane graph with a connection line between the center point and the second target point as the symmetry axis, a length of one side of the rectangle being a length of the connection line between the center point and the second target point, a length of another side of the rectangle being the length of the diagonal.

13. The apparatus for controlling a robot according to claim 12, wherein the performing laser irradiation from the center point to the area of the closed plane graph to acquire the laser point set comprises:
establishing a coordinate system with the center point as an origin;
determining coordinates of the vertices of the rectangle;
performing laser irradiation from the center point to an area of the rectangle to acquire coordinates of the laser points formed by the laser irradiation on the obstacle; and
determining coordinates of all the laser points in the laser point set according to the coordinates of the vertices of the rectangle, the coordinates of the laser points formed by the laser irradiation on the obstacle, and a direction pointing from the center point to the second target point.

14. The apparatus for controlling a robot according to claim 13, wherein the determining coordinates of the vertices of the rectangle comprises:
calculating the coordinates of the vertices of the rectangle according to a length of a neutrality line of the rectangle, the length of the diagonal, and the direction pointing from the center point to the second target point.

15. The apparatus for controlling a robot according to claim 10, wherein the controlling the movement state of the robot according to a farthest distance between the center point and the laser points in the laser point set comprises:

in a case where the farthest distance is not greater than a first threshold, controlling the robot to stop moving.

16. The apparatus for controlling a robot according to claim 15, wherein the first threshold is half of a length of a diagonal of the chassis of the robot.

17. The apparatus for controlling a robot according to claim 10, wherein the controlling the movement state of the robot according to a farthest distance between the center point and the laser points in the laser point set comprises:

in a case where the farthest distance is greater than a first threshold, controlling a movement direction of the robot according to a laser point at the farthest distance from the center point in the laser point set.

18. The apparatus for controlling a robot according to claim 17, wherein the controlling the movement direction of the robot according to the laser point at the farthest distance from the center point in the laser point set comprises:

with the laser point at the farthest distance from the center point as a starting point, clockwise searching, from the laser point set, a first one laser point at a distance from the center point equal to the first threshold, as a first laser point;

with the laser point at the farthest distance from the center point as a starting point, counterclockwise searching, from the laser point set, a first one laser point at a distance from the center point equal to the first threshold, as a second laser point; and controlling the robot to move towards a direction of a bisector of an angle between a first ray pointing from the center point to the first laser point and a second ray pointing from the center point to the second laser point.

19. The apparatus for controlling a robot according to claim 10, the method further comprising:

determining whether the center point enters a preset junction area corresponding to a preset passage, a width of the preset passage being less than a second threshold, wherein in a case where the center point enters the preset junction area, executing the operation of constructing the closed plane graph according to the size of the chassis of the robot.

20. A non-transitory computer-readable storage medium having stored thereon computer program instructions which, when executed by a processor, implement steps of a method comprising:

determining an area of a closed plane graph according to a size of a chassis of the robot, the area of the closed plane graph passing through a center point of the chassis of the robot and a target point on a planning path of the robot, a connection line between the center point and the target point being a symmetry axis of the closed plane graph;

performing laser irradiation from the center point to the area of the closed plane graph to acquire a laser point set, wherein:

if a distance between the center point and a laser point formed by the laser irradiation on an obstacle is greater than a distance between the center point and a laser point formed by the laser irradiation on the area of the closed plane graph, the laser point formed by the laser irradiation on the area of the closed plane graph is added into the laser point set; and if the distance between the center point and the laser point formed by the laser irradiation on the obstacle is not greater than the distance between the center point and the laser point formed by the laser irradiation on the area of the closed plane graph, the laser point formed by the laser irradiation on the obstacle is added into the laser point set; and controlling a movement state of the robot according to a farthest distance between the center point and the laser points in the laser point set.

\* \* \* \* \*